(12) United States Patent
Ceccom et al.

(10) Patent No.: US 8,547,285 B2
(45) Date of Patent: Oct. 1, 2013

(54) UNIT COMPRISED OF A GLIDEPATH AERIAL AND A SUPPORT MEMBER

(75) Inventors: Rene Ceccom, Saiguede (FR); Philippe Besson, Segoufielle (FR); Christian Nguyen, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 401 days.

(21) Appl. No.: 12/427,102

(22) Filed: Apr. 21, 2009

(65) Prior Publication Data

US 2009/0284427 A1    Nov. 19, 2009

(30) Foreign Application Priority Data

Apr. 29, 2008    (FR) ...................................... 08 52869

(51) Int. Cl.
*H01Q 1/28*    (2006.01)
*H01Q 1/52*    (2006.01)

(52) U.S. Cl.
USPC .......................................... 343/705; 343/841

(58) Field of Classification Search
USPC .................. 343/700 MS, 705, 708, 846, 848, 343/841
See application file for complete search history.

(56) References Cited

U.S. PATENT DOCUMENTS

| 3,587,102 | A | * | 6/1971 | Czerwinski | 343/708 |
| 3,662,392 | A | | 5/1972 | Stapleton et al. | |
| 3,771,157 | A | * | 11/1973 | Stang | 343/708 |
| 3,868,693 | A | * | 2/1975 | Young | 343/708 |
| 3,945,013 | A | * | 3/1976 | Brunner et al. | 343/708 |
| 5,121,128 | A | | 6/1992 | van Lidth de Jeude et al. | |

FOREIGN PATENT DOCUMENTS

| EP | 1 617 510 A | 1/2006 |
| GB | 516 482 A | 1/1940 |

* cited by examiner

*Primary Examiner* — Michael C Wimer
(74) *Attorney, Agent, or Firm* — Greer, Burns & Crain Ltd.

(57) ABSTRACT

A unit includes a glidepath aerial and a support organ designed to be mounted on the front landing gear of an aircraft, with the landing gear forming an electrically conductive ground plane. The aerial is mounted on the support organ and is electrically insulated from this support organ by insulating elements. The support organ has a longitudinal dimension at least equal to around one quarter of the wavelength $\lambda$ at which the aerial functions, so that the distance separating this aerial and the ground plane is greater than $\lambda/4$, and the aerial also has a transmission line designed to connect the aerial to a receiver in the aircraft. The transmission line is surrounded by an electromagnetic shielding element serving as a faradization screen for the transmission line, and designed to be electrically connected to the ground plane.

10 Claims, 2 Drawing Sheets

UNIT COMPRISED OF A GLIDEPATH AERIAL AND A SUPPORT MEMBER

CROSS-REFERENCE TO RELATED APPLICATIONS

This application claims priority to and the benefit of French Application No. 08 52869 filed on 29 Apr. 2008.

BACKGROUND

The disclosed embodiments concern a unit comprised of a glidepath aerial and support member for it; the unit is designed to be mounted on the front landing gear of an aircraft, particularly a civilian transport airplane.

Devices are known that help steer an aircraft, particularly the ILS "instrument landing system" to guide an aircraft in its landing phase. This precise instrument runway approach system is particularly useful to the pilot in the event of poor visibility (snowfall, heavy rain . . . ) or in the absence of visibility (thick fog).

Devices are known that help steer an aircraft, particularly the ILS "instrument landing system" to guide an aircraft in its landing phase. This precise instrument runway approach system is particularly useful to the pilot in the event of poor visibility (snowfall, heavy rain . . . ) or in the absence of visibility (thick fog).

When an airplane deviates from its final approach trajectory, this system gives the pilot the lateral deviation compared to the longitudinal axis of the runway and the vertical deviation compared to the glide path for a specific angle of approach. The aircraft can then correct this final approach.

Such a landing system includes, on one hand, automatic stations located on the edge of the landing strip and onboard the airplane, and, on the other hand, a locator and a glidepath aerial. This dual aerial system is generally mounted in the space delimited by the radome in the nose of the airplane. These aerials are then supported by the watertight bulkhead of the fuselage.

This installation principle for the glidepath aerial in the radome follows the operational rules of the International Civil Aviation Organization, mainly for medium-sized airplanes, type WB, SA, LR such as A 330/340 airplanes.

These rules specifically require that the vertical distance to the runway threshold between the trajectory of the bottom of the wheels of the main landing gear and the trajectory of the glidepath be limited to a maximum of 19 feet. This is called the "19-foot rule."

However, it has been found that airplanes with a longer fuselage than the A380 needed to add a second glidepath aerial called a "GLIDE TRACK" aerial that must be installed in the front of the plane so that it rises on the glidepath when it goes to a predetermined altitude threshold.

The instrument landing system does the switching between these two glidepath aerials.

The requirements in terms of performance of the instrument landing system, classified critical since they are linked to the automatic landing system, condition the installation of this second "GLIDE TRACK" aerial in the front of the plane below the capture aerial.

This positioning makes it possible to prevent the problems of shadows on the charts for the aerial and lever arms in relation to the pilot's eye.

Consequently, it is known how to install this second aerial on the leg of the front landing gear of the airplane.

However, this glidepath aerial is not protected very much or not at all while it is exposed to a particularly hostile environment in the front landing gear area.

First of all, this area is highly exposed during ground maintenance operations because of the presence of the electrical ground connection and the access to the tow bar. Although this work can be done by qualified operators, human error can result in damage to the glidepath aerial.

This area is also vulnerable in flight because of the absence of a ground plane, or radioelectric counterweight, stable from an electrical standpoint. Indeed, the equipotential of this ground plane with the nose cone of the fuselage is difficult to control, considering the joints and rotating bearings used at the junction of the front landing gear/nose cone.

Moreover, the different elements of which the front landing gear is composed generate a very wide vibratory spectrum that can interfere with the aerial function.

What is more, it is necessary to take into account the aerodynamic effect of the leg/wheel unit on the physical maintenance of the beams connecting this aerial to the receiver in the airplane fuselage, mainly at the interface between the jointed front landing gear/gear housing. It is also necessary to take into account the promiscuity of the electrical and hydraulic circuits along the leg of the landing gear, which can cause serious malfunctions if leaks appear in the hydraulic circuits.

Lastly, this glidepath aerial is particularly exposed to severe meteorological conditions that can occur in flight, such as hail and lightning.

All these elements interfere with the proper operation of this second glidepath aerial by generating interference that is superimposed on the "Glide" deviation (DDM modulation difference) generated by the receiving unit of the MMR-type (multi-mode receiver) auxiliary landing receiver.

SUMMARY

On heavy cargo planes, noise levels have been observed such that the operation of this glidepath aerial has been considered unacceptable for automatic landing tests.

The goal of the disclosed embodiments is therefore to propose a unit that includes a glidepath aerial designed to be supported by the front landing gear of an aircraft by means of a support member that is simple in design and in operating mode and that makes it possible to fix the disadvantages of the prior art cited above.

To do so, the disclosed embodiments concern a unit that includes a glidepath aerial and a support member designed to be mounted on the front landing gear of an aircraft; this landing gear forms an electrically conductive ground plane. According to the disclosed embodiments, this aerial is mounted on the support member and is electrically insulated from this support member by insulating elements, the support member has a longitudinal dimension at least equal to around one quarter of the wavelength λ at which the aerial functions so that the distance separating this aerial and the ground plane is greater than λ/4, and the aerial also has a transmission line designed to connect the aerial to a receiver in the aircraft; this transmission line is surrounded by an electromagnetic shielding element that serves as a faradization screen for the transmission line and is designed to be connected electrically to the ground plane.

Preferably, to take into account the severe environment in the area where the glidepath aerial is installed, from a mechanical standpoint, the aerial has been designed with a radiating metallic element (resistance to hail, natural mechanical protection and lightning protection). In addition, to meet the EMC and reliability requirements, from an electrical standpoint, this aerial has a non-symmetrical RF output. So there is no insulation transformer. The radiating element and the coaxial connector are grounded electrically at the base.

This electromagnetic shielding element is an advantage that makes it possible to create a faradization zone around the transmission line that is, for example, a coaxial cable, and to do so from the aerial connector to the coaxial lead-in sealed bulkhead connector to the receiver in the aircraft to protect the transmission line from exterior electromagnetic attack.

In different special embodiments of this unit, each with its special advantages and each capable of many possible technical combinations:

the unit has at least one electrically conductive element connected, on one hand, to the aerial to drain the energy generated by a lightning attachment on this aerial and, on the other hand, to a spark-gap lightning system, with this spark-gap lightning system placed beside the support member to generate from that energy at least a lightning arc that attaches itself to the support member, The galvanic insulation of the glidepath aerial is an advantage in that it can be freed of ground loops and variations in potential of the ground plane to which it is attached.

However, this aerial is referenced to the potential of the receiver housed in the aircraft through the transmission line and the bulkhead lead-in. The result is that the multimode receiver that helps with landing is no longer protected from the signals induced in the aerial when there is a lightning attachment to it.

This spark-gap lightning system makes it possible to protect the multimode receiver advantageously from the indirect effects of a lightning attachment to the glidepath aerial.

since the electrically conductive elements have at least some of the members for attaching the aerial to the support member, the spark-gap system includes at least one insulating washer and one metal washer with a diameter greater than the diameter of the insulating washer, which are placed on the side of the outer surface of the support member and are connected to the attachment members; this metal washer is designed to be kept at a distance d from the external surface of the support member by the insulating washer to form an air gap making it possible to generate lightning arcs between this metal washer and the outer surface of the support member, each unit formed by the insulating and metal washers and the screw of the attachment member is also covered with an insulating cover or is immersed in a matrix enveloping that unit. Purely by way of illustration, it can be a paste charged with insulating particles, such as a silicon paste.

the insulating elements include an insulating joint placed between the aerial and the support member and hollow insulating inserts, each holding at least part of the rod of an attachment member for this aerial on the support member, the electromagnetic shielding element is covered with a protective sheath against corrosive climates; this protective sheath is also electrically insulating so as to provide electrical insulation of the shielding element vis-à-vis the front landing gear.

The disclosed embodiments also concern a glidepath unit including a front aircraft landing gear and a unit that has a glidepath aerial and a support member, with said unit supported by said landing gear.

According to the disclosed embodiments, this unit is one that includes a glidepath aerial and a support member as previously described.

Preferably, this aerial has a transmission line with connectors on the ends and landing gear forming a ground plane; this electromagnetic shielding element is connected electrically to the ground plane by at least three points. The first point is formed by one of the connectors connected to the wall of the front gear housing. The second is formed by the other connector connected to said support member, and the third is formed by the median portion of that element connected to said front gear.

The disclosed embodiments also concern an aircraft equipped with a glidepath aerial, as described previously.

BRIEF DESCRIPTION OF THE DRAWINGS

The disclosed embodiments will be described in greater detail with reference to the attached drawings in which.

DETAILED DESCRIPTION

Figure 1:
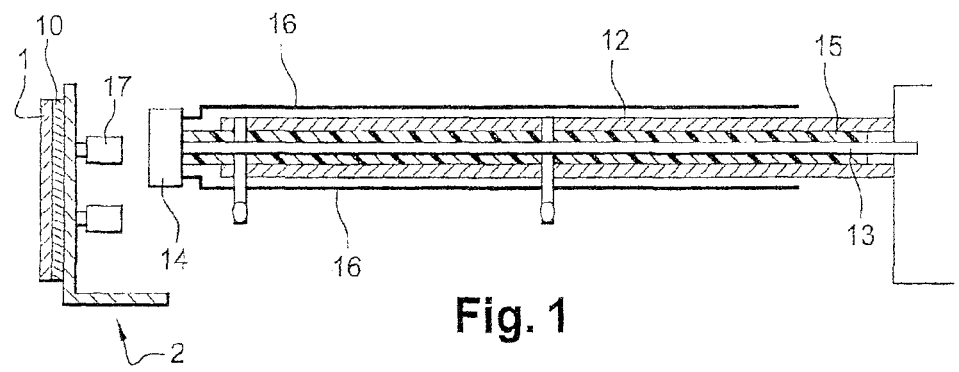
FIG. 1 shows a schematic partial side view in cross section of a unit with a glidepath aerial and its support member according to one special embodiment of the disclosed embodiments.
Figure 2:
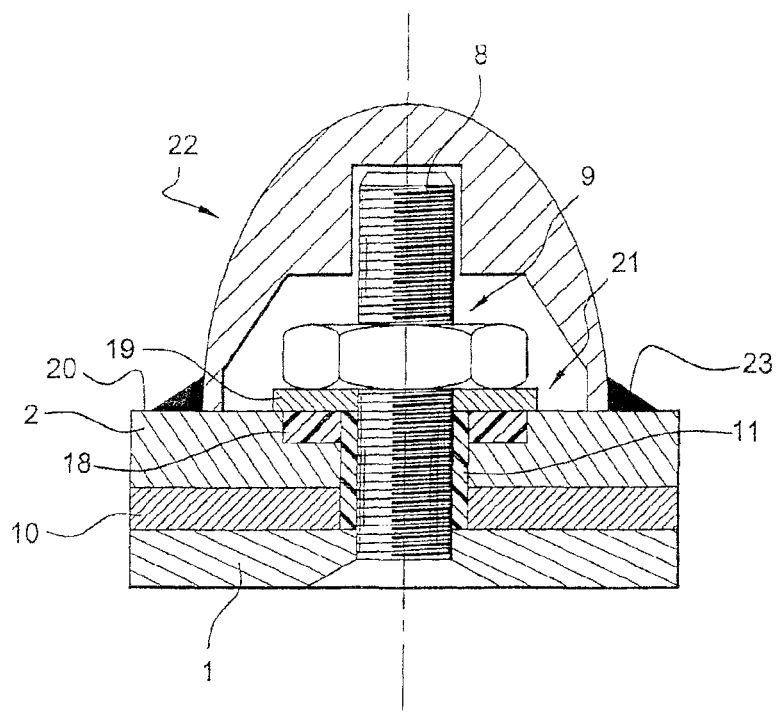
FIG. 2 is a schematic view in enlarged cross section of the connection between the aerial and its support member shown in FIG. 1.
Figure 3:
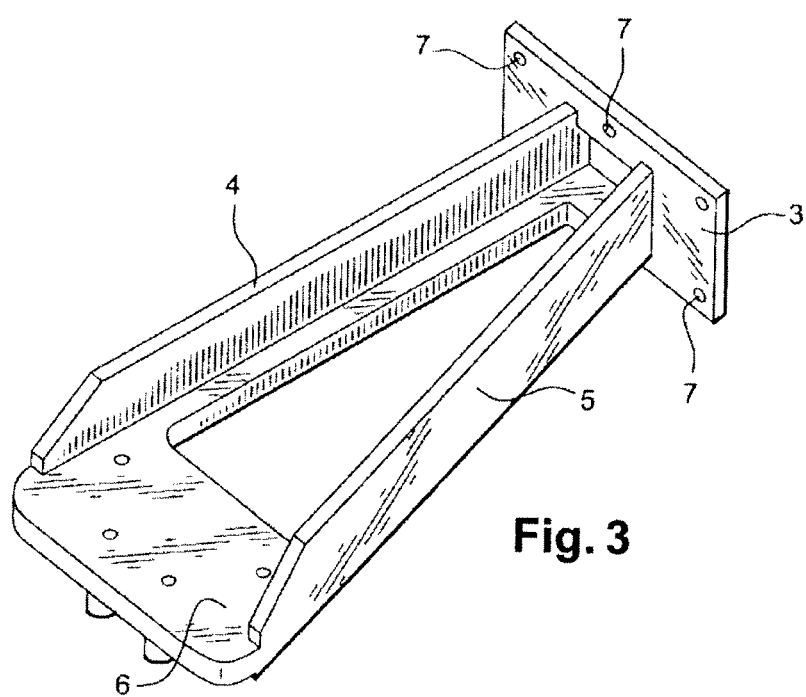
FIG. 3 is a schematic, perspective view of the support member in FIG. 1.

FIGS. 1 to 3 show a unit having a glidepath aerial 1 and its support member 2 according to one preferred embodiment of the disclosed embodiments. This unit is designed to be supported by the front landing gear of an aircraft, with the landing gear forming an electrically conductive ground plane.

The support member 2 has a longitudinal dimension equal to around one quarter of the wavelength $\lambda$ at which said aerial 1 functions, so that the distance separating said aerial 1 and the ground plane is greater than $\lambda/4$.

This support member 2 makes it possible to move the aerial from the leg of the front gear and consequently to position it in an electromagnetic environment more favorable than the one mentioned in the environment near the leg of the front gear.

Considering the length of the overhang of this support member 2 and its attachment to the leg of the front landing gear, its design must be sturdy to meet the requirements of the vibratory spectrum attributed to that area.

According to FIG. 3, this support member 2, which is metal, has a base plate 3 designed to hold said aerial 1 and arms 4, 5 that are L-shaped in cross section and connect this base plate 3 to a unit plate 6 for the support member on the leg of the front landing gear.

This base plate 3 is vertical in relation to the longitudinal axis of the aircraft and has holes 7 for the rod of the attachment members 8, 9 for the aerial to go through on this base plate 3.

The aerial is electrically insulated from this support member 2 by insulating elements that have an insulating joint 10 placed between the sole of the aerial 1 and the base plate 3 of the support member. This insulating joint 10 is made of Teflon, purely for purposes of illustration, or something equivalent, but it must nonetheless be compression-resistant enough.

The members for attaching the aerial to the support member each have a securing screw 8 and a nut 9 (FIG. 3). These securing screws 8 are electrically insulated from the support member 2 by installing bushings 11, or inserts, made of insulating plastic in each of the holes 7 on the base plate 3 of the support member.

These inserts 11 could also be made of polyamide 12 (PA12) RILSAN® sold by the Arkema Company. Alternatively, these inserts can be made of acetal resin. Delrin® sold by Dupont de Nemours is particularly well suited for the disclosed embodiments.

The glidepath aerial 1 also includes a transmission line designed to connect this aerial to a receiver (not shown) in the aircraft by going through a sealed aircraft bulkhead. This receiver is typically a multimode receiver as a landing aid, preferably the MMR type ("Multi Mode Receiver").

This transmission line is surrounded by an electromagnetic shielding element 12 that serves as a faradization screen from the transmission line to protect the transmission line from exterior electromagnetic attack.

The transmission line advantageously includes a double-braided coaxial cable 13, size 5, connected to these two ends to N-type coaxial connectors 14.

To make sure the coaxial cable 13 can be guided well and stay intact in areas where it is stressed in flexure during maneuvers of the front gears, a convoluted sheath 15 made of propylene protects the coaxial cable 13.

The electromagnetic shielding element 12 here is made up of a metal braid with low impedance, which covers the convoluted sheath 15. The wires of which this braid is formed are, for example, nickel-plated copper wires with low conductivity.

The transmission line can advantageously have, on the end beside the support member, at its low point, a drainage hole (not shown) that allows the water from condensation to drain out which could accumulate in the convoluted sheath 15.

In order to protect this shielding element 12 from inclement weather and make sure it is fully insulated electrically from the metal elements that constitute the front landing gear, a protective sheath 16 composed of fiberglass covers the whole transmission line, which allows the electromagnetic shielding element, here a metal braid, to "breathe" and thus limit corrosion.

The electromagnetic shielding element 12 is placed at the electric ground of the front landing gear through two flat electric braids at specific points in order to ensure faradization of the coaxial cable 13 of the transmission line.

First of all, the end of the electromagnetic shielding element 12 beside the glidepath aerial 1 is grounded electrically by a flat braid near the support member 2 and the connectors 17 for the aerial.

The other end of the electromagnetic shielding element is grounded electrically by the coaxial connecting body near the bulkhead of the gear housing.

In addition, the median part of the shielding element is grounded electrically by a flat braid via a metal point on the leg of the front landing gears.

Lightning protection for the glidepath aerial is provided by a spark-gap system (FIG. 2), which is placed beside the support member 2 to generate one or more lightning arcs attaching to the support member from the energy generated by the lightning attachment on the aerial 1.

This spark-gap lightning system is installed on 4 of the 6 securing screws of the aerial 1 on the support member 2. It includes an insulating washer 18 with a diameter D made of fiberglass or an equivalent material that resists compression. Alternatively, this washer 18 can also be attached to the insulating bushing 11 to form one piece or to be a piece with a single holder. The system includes a metal washer 19 with a diameter φ greater than the diameter D of the insulating washer placed below, working as a spark gap. This washer 19 is held by the nut 9 of the attachment member.

A distance d separates the outer surface 20 of the support member 2 and the metal washer 19 to form an air gap 21 making it possible to generate lightning arcs between this metal washer 19 and the outer surface of the support member 2. This distance d, which is 0.3 mm, for example, is controlled by the thickness of the insulating washer 18 and the tightening torque of the screw-nut unit.

The nut 9, metal washer 19 and insulating washer 18 unit is also protected from outside climatic conditions by an insulating capsule 22 that is made integral with the support member 2 by an adhesive layer 23 or by the application of an insulating mastic.

The invention claimed is:

1. A unit including a glidepath aerial and a support member constructed with a landing gear mounting area to be mounted on the front landing gear of an aircraft, with the landing gear mounting area comprising a point of contact and connection for the support member directly to the landing gear, and with said landing gear forming an electrically conductive ground plane, wherein:

said aerial is mounted on an aerial mounting area of said support member by being electrically insulated from said support member by insulating elements, said support member has a longitudinal dimension from the point of connection of the aerial at the aerial mounting area to a point of attachment of the landing gear at the landing gear mounting area of said support member at least equal to around one quarter of the wavelength λ at which said aerial functions, so that the distance separating said aerial and said ground plane formed by the front landing gear is greater than λ/4, and said aerial also has a transmission line intended to connect said aerial to a receiver in the aircraft; said transmission line is surrounded by an electromagnetic shielding element serving as a faradizations screen for said transmission line, with said element designed to be electrically connected to said ground plane.

2. The unit of claim 1, comprising at least one electrically conductive element connected, on one hand, to said aerial to drain the energy generated by lightning attachment on said aerial and, on the other hand, to a spark-gap system, with said spark-gap system placed beside said support member to generate at least one lightning arc that attaches itself to said support member from said energy.

3. The unit of claim 2, wherein said electrically conductive elements have at least some attachment members for said aerial on said support member, said spark-gap system includes at least one insulating washer and one metal washer with a diameter greater than the diameter of said insulating washer, which are placed beside the outer surface of said support member and connected to said attachment members, with said metal washer designed to be kept at a distance d from the outer surface of said support member by said insulating washer to form an air gap permitting the generation of lightning arcs between said metal washer and said outer surface of said support member.

4. The unit of claim 3, wherein each unit formed by said insulating and metal washers and said nut of the attachment member is also covered with an insulating cover or is immersed in a matrix formed by a non-conductive paste.

5. The unit of claim 1, wherein said insulating elements include an insulating joint placed between said aerial and said support member and hollow insulating inserts, each holding at least part of the rod of a member for attaching said aerial on said support member.

6. The unit of claim 1, wherein said electromagnetic shielding element has a metal braid with low impedance.

7. The unit of claim 1, wherein said electromagnetic shielding element is covered with a sheath to protect it from climate attack, with said protective sheath being more electrically insulating in order to provide electrical insulation for said shielding element from said front landing gear.

8. A glidepath unit having front aircraft landing gear and the unit according to claim 1 including the glidepath aerial and the support member, with the unit of claim 1 supported by said landing gear.

9. The unit of claim 8, wherein said transmission line has connectors on its ends, and said landing gear forms a ground plane; said electromagnetic shielding element is electrically connected to said ground plane by at least three points, the first point being formed by one of the connectors connected to the wall of the front landing gear housing, the second being formed by the other connector connected to said support member and the third being formed by a median portion of said element connected to said front landing gear.

10. An aircraft equipped with the glidepath unit of claim 8.

* * * * *